Patented Dec. 24, 1929

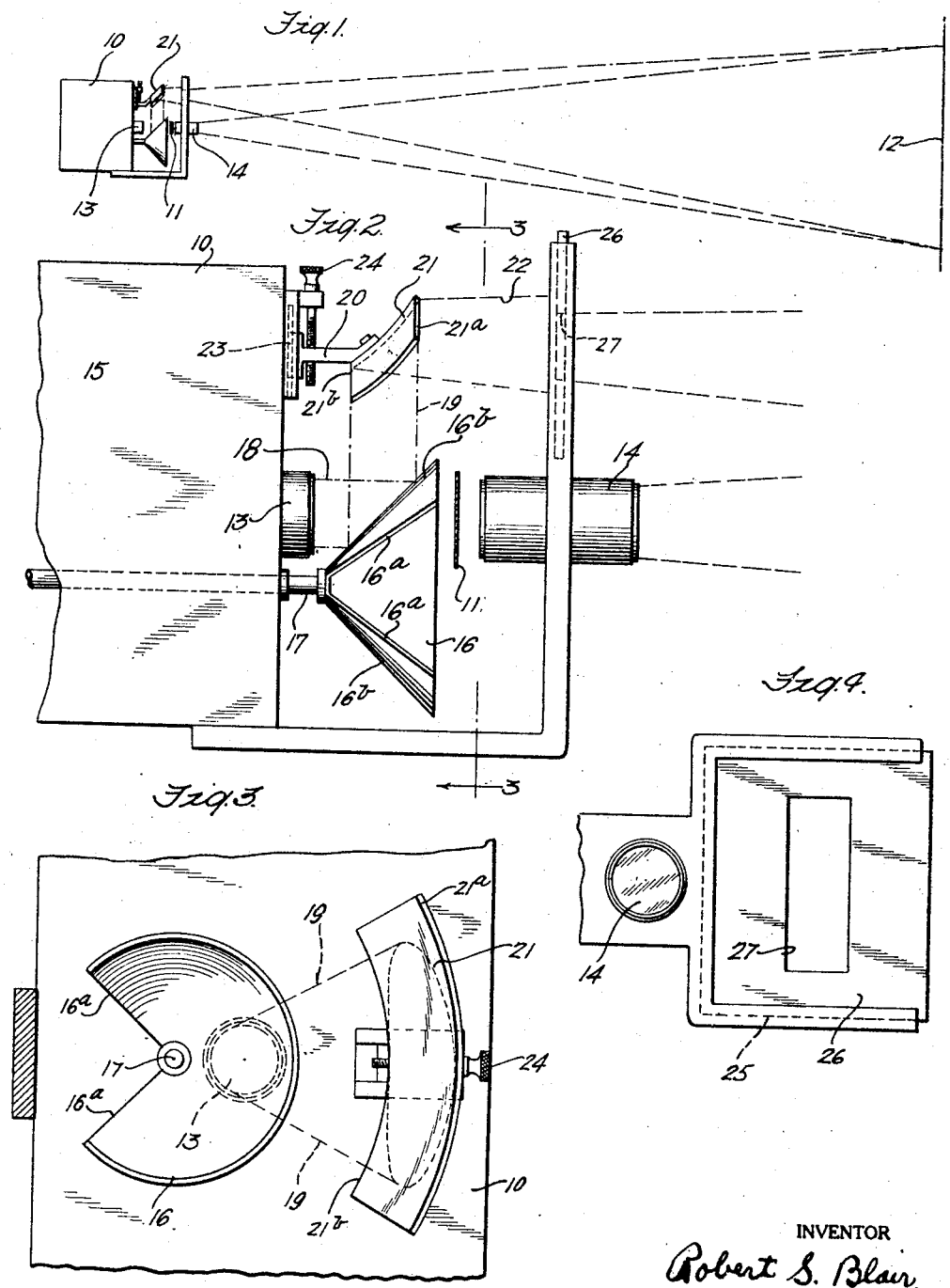

1,740,677

UNITED STATES PATENT OFFICE

ROBERT S. BLAIR, OF STAMFORD, CONNECTICUT

MOVING-PICTURE APPARATUS

Application filed August 29, 1924. Serial No. 734,856.

This invention relates to projecting apparatus for moving pictures. One of the objects thereof is to provide apparatus of the above nature practical and efficient and capable of meeting the requirements of practical use in a highly satisfactory manner. Another object is to provide apparatus of the above nature adapted in an effective manner to overcome flickering. Another object is to provide such apparatus simple in construction and dependable in operation. Another object is to provide such apparatus capable of convenient adjustment to the varying conditions of use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which is shown one of the various possible embodiments of this invention, Figure 1 is a diagrammatic plan view of a moving picture apparatus;

Figure 2 is a plan view of the projecting apparatus in larger detail;

Figure 3 is a section taken substantially along the line 3—3 of Fig. 2, and

Figure 4 is a front elevation of a portion of the apparatus shown in Fig. 2.

Similar reference characters refer to similar parts throughout the several views of the drawing.

Referring now to the drawing in detail, there is diagrammatically shown in Figure 1 a casing 10 adapted to contain a source of light from which rays are projected through a film 11 to a screen 12. The light is adapted to pass from the source within the casing 10 through a condenser 13 to the film 11 and thence through an objective 14 to the screen. These parts are shown in somewhat larger detail in Figure 2, the source of light being indicated at 15 within the casing 10. The source of light, the condenser 13, the film 11, and the objective 14, are all of the usual well-known construction operating in the well-known manner, so that in order not to unnecessarily encumber the drawings these parts are shown only somewhat diagrammatically. The film 11, it will be understood, is of the usual strip form and is fed or driven downwardly with an intermittent movement in front of the objective 14. The drive for moving the film intermittently may be of any suitable well-known type.

Interposed between the condenser 14 and the film 11 is a shutter 16 which is mounted upon a rotatable shaft 17. As is well known in the moving picture art, the shutter interposed between the source of light and the film is adapted to cut off the beam of light from passage through the film at each movement of the latter. While the film is stationary, the shutter operates to permit passage of light therethrough to project the image from the film to the screen. The shaft 17 carrying the shutter 16 is constantly rotated in timed relation with the intermittent movement of the film 11. This drive is not shown in the drawing since it may be of a well known type operating through gearing, for example, or other suitable drive, from the mechanism which drives the film 11 in such manner that the rotation of the shutter and the movement of the film are in synchronism.

The shutter 16 shown in the drawing is preferably substantially conical in shape and rotates about its central axis, the walls thereof projecting between the condenser 13 and the film 11, as clearly shown in Figure 2. The conical walls are cut away at a portion thereof to provide an opening $16^a$ therethrough and the remaining walls of the cone are opaque. The shaft 17 is so driven in synchronism with the intermittent drive of the film 11 that when the film is stationary the opening $16^a$ is positoned in the path of the beam of light from the condenser 13 and the light passes through the film projecting the image thereof upon the screen 12. During each intermittent movement of the film 11 the opaque portion of the cone-shaped shutter rotates before the film and the beam of light thereto is cut off.

The entire surface $16^b$ of the cone-shaped shutter 16 between the two sides of the opening 16ᵃ is reflecting, being preferably silvered or otherwise prepared to form a mirror-like surface. The beam of light passing from the condenser 13 and indicated by the dotted lines 18 in Figure 2, is therefore reflected from the surface of the shutter substantially in the direction indicated by the dotted lines 19 in Figure 2. Thus, at each intermittent movement of the film 11 the rays of light cut off from the film are reflected and directed in substantially the direction indicated.

Supported as by a bracket 20 in the path of the light reflected from the shutter 16 is a mirror 21. This mirror is adapted to direct the light rays around the film 11 and the objective 14 onto the screen 12. The substantial direction taken by the rays reflected from the mirror 21 is indicated by the lines 22. This light passing to the screen 12 by way of the mirror surfaces 16ᵇ and 21 therefore illuminates the screen 12 during the intervals when the film 11 is being moved and the light therethrough is cut off. Thus, instead of the film being darkened between the intermittent projections of the pictures thereon the screen is illuminated.

In the apparatus as shown in the drawing, the beam of light 18 emitted from the condenser 13 is shown passing therefrom in substantially parallel rays. As viewed in Figure 2, therefore, the rays comprising the beam 19 reflected from the mirror surface 16ᵇ are substantially parallel. However, as viewed at right angles to Figure 2 and as shown in Figure 3, the rays of the beam 19 reflected from the surface 16ᵇ diverge vertically due to the rounded surface of the cone along a line transverse to its axis. The beam striking the mirror 21 is therefore substantially oval in shape, as indicated in Figure 3. The surface of the mirror 21 preferably comprises substantially a portion of a cone substantially concentric with the cone 16. As brought out in Figure 2, however, it is somewhat convex between its two sides 21ᵃ and 21ᵇ so that the rays of the beam 19 which are parallel in a vertical plane, as viewed in Figure 2, are caused to diverge upon leaving the surface of the mirror 21, whereby the beam 22 diverges horizontally. Thus, the beam of light 22 directed by the mirror 21 toward the screen 12, as viewed in plan is diverging. This horizontal divergence is preferably such that the beam of light upon reaching the screen 12 is of substantially the width of the screen. If the beam 18 from the condenser 13 is diverging, the beam 19, as viewed in Figure 2, would also be diverging, so that in order to obtain the desired divergence of the beam 22 a lesser convex curvature of the mirror 21 as described would be required.

The beam of light 19 passing between the mirrors 16ᵇ and 21, as has been described and as shown in Figure 3, diverges vertically. When the cone-shaped reflecting surface 21 is concentric with and parallel to the surface 16ᵇ, the rays of the beam 22 projected from the mirror 21 are substantially parallel in a vertical plane. As has been described above, the mirror 21 is convex between its sides 21ᵃ and 21ᵇ so that the beam diverges horizontally to an amount so that at the screen 12 it is of substantially the width of the latter. It is desired that the beam 22 also diverge vertically to a sufficient extent that upon reaching the screen 12 it be of substantially the height of the screen. The vertical divergence of the beam 22 may be controlled by moving the mirror 21 toward or away from the cone 16 so that its surface moves out of parallelism with the surface of the cone 16. For this purpose, the bracket 20 carrying the mirror 21 is slidable in a guide 23 and adjustable toward and away from the cone 16 by means of a screw 24. Thus, it will be seen that by proper shaping and adjustment of the mirror 21 a diverging beam of light is had directed therefrom toward the screen 12. Moreover, it will be seen that substantially all of the light of the beam 18, excepting the small loss in the mirrors, is utilized for illuminating the screen during the intermittent movement of the film when the film is dark.

Preferably suitable means is provided for regulating the size of the beam 22 so that it may be accommodated to screens of different sizes and screens positioned at different distances from the projecting apparatus. For this purpose, variable sized apertures are preferably provided for the passage of the beam 22 therethrough. As best shown in Figure 4, a bracket 25 is provided in which fit removable slides 26. A number of these slides may be provided with different sized openings 27 therein for the passage of the rays of the beam 22. Due to the oval shape of the beam leaving the mirror 21 the apertures 27 are rectangular in shape as indicated, the horizontal and vertical divergence of the beam 22 being such that upon reaching the screen the beam is substantially square in cross-section to correspond with the shape of the screen.

From the above, it will be seen that there is herein provided a moving picture projecting apparatus whereby the screen during the intervals between the projection of the pictures thereon is illuminated instead of darkened. The objectionable flickering found in motion pictures is thereby substantially avoided; the apparatus is simple in construction and operation, and capable of convenient adjustment to the varying conditions of practical use.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In motion picture apparatus, in combination, a film, a screen, a source of light means adapted to project rays from said source of light through said film to said screen, means interposed between said source of light and said film adapted intermittently to interrupt said rays and divert them from said film, and means adapted to direct the rays thus diverted to said screen by a path exterior of said film.

2. In motion picture apparatus, in combination, a screen, a film, a source of light, means adapted to project rays from said source of light through said film to said screen, a reflector of a general conical form interposed between said source of light and said film and adapted intermittently to divert said rays from said film, and means adapted to direct the rays thus diverted to said screen exterior of said film.

3. In motion picture apparatus, in combination, a screen, a film, a source of light, means adapted to project rays from said source of light through said film to said screen, a single shutter interposed in the path of said rays between said source of light and said film adapted intermittently to cut off said rays from said film and divert them into another path, and means adapted to direct the rays thus diverted to said screen by a path exterior of said film.

4. In motion picture apparatus, in combination, a film, a screen, a source of light, means for projecting light rays from said source through said film to said screen, reflecting means adapted intermittently to cut off said light rays from said film, and reflecting means adapted to project said reflected light rays to said screen, one of said reflecting means being shaped to present a convex surface to the light.

5. In motion picture apparatus, in combination, a source of light, a film, a screen, means for projecting a beam of light in a straight path from said source through said film to said screen, means for intermittently diverting said beam from said path, and means for projecting the light thus diverted from a point offset with respect to said first beam in a direction converging with respect to said path to the area upon said screen covered by the beam passing through said film.

6. In motion picture apparatus, in combination, a single source of light, a film, a screen, means adapted to direct light from said source through said film upon said screen, means adapted intermittently to interrupt said light and divert the same, and means adapted to throw the light thus diverted from a point offset with respect to the path of light through said film in a line converging in a direction toward said screen with respect to the path of the light through the film whereby it is adapted to illuminate substantially the same area of the screen.

7. In motion picture apparatus, in combination, a source of light, a condenser, a film, a screen, means for projecting a beam of light in a straight path from said source through said condenser and film to said screen, means positioned and acting between said condenser and said film adapted intermittently to cut off said beam and divert the rays of said beam and means adapted to throw said diverted rays on the screen by a path exclusive of said film in a non-image-forming illumination.

8. In motion picture apparatus, in combination, a film, a screen, a source of light, means for projecting a beam of light from said source through said film to said screen, means adapted intermittently to interrupt said beam of light, means adapted to direct the diverted light to said screen in a beam which would tend to illuminate a greater area of said screen than is illuminated by said first beam, and means positioned in the path of said second beam and out of the path of said first beam adapted to control said second beam and cut off excess rays so as to bring its area of illumination on the screen into registry with that of said first beam.

In testimony whereof, I have signed my name to this specification this 27th day of August, 1924.

ROBERT S. BLAIR.